May 25, 1937.　　　　W. A. DUFFIELD　　　　2,081,863

VARIABLE SPEED TRANSMISSION

Filed June 8, 1936

INVENTOR
William A. Duffield
BY
Hanbury A. Sundew
ATTORNEY.

Patented May 25, 1937

2,081,863

UNITED STATES PATENT OFFICE 2,081,863

VARIABLE SPEED TRANSMISSION

William A. Duffield, Montreal, Quebec, Canada, assignor to Juno Corporation Limited, Montreal, Quebec, Canada, a corporation Application June 8, 1936, Serial No. 84,023

6 Claims. (Cl. 74—293)

This invention relates to variable speed transmission of the drive of prime movers to the operating shaft of automobiles and the like.

The object of the invention is to provide a mechanism that will be semi-automatic.

A further object is to provide a mechanism including a Fottinger fluid coupling, with means to fill or empty its members, whereby the drive is made automatic only when the fluid coupling is filled.

A further object is to provide a mechanism in which the drive to the tail shaft is not directly connected to the fluid coupling but continues through reduction gears until the fluid coupling is cut in by manual control.

Reference is made to the accompanying drawing in which.

The construction is as follows:—

Figure 1:
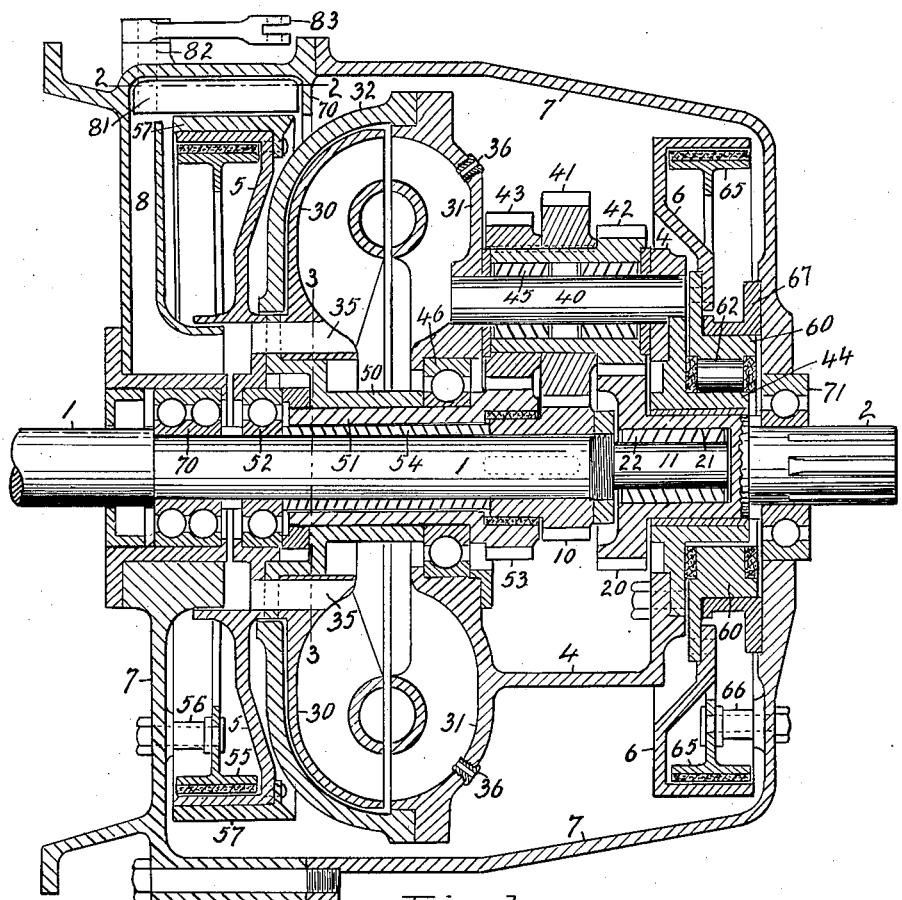
Figure 1 is a vertical longitudinal section through axis to the shafts.

The casing 7 is in two sections which are secured together by bolts. A drive shaft 1 which is connected to a prime mover by the usual clutch is journalled in bearings 70 in the casing 7.

A tail shaft 2 is journalled in bearings 71, in the casing 7, and has a bore 21 with bearings 22 to receive the extension 11 of the drive shaft 1. Keyed to the shaft 1 is a pinion 10, while the tail shaft ends in a pinion 20.

The pinion 10 meshes with a series of planetary gears 41 keyed to a series 42 which mesh with the pinion 20.

The planetary gears are journalled on pins 40 in a carrier 4.

This carrier 4 has a sleeve 44 journalled on the tail shaft 2.

Its opposite end is integral with the runner member 31 of a Fottinger fluid coupling, and is journalled on a ball bearing 46.

An over running clutch 62, in a sleeve 60 secured to a brake drum 6, bears on the sleeve 44 of the carrier 4. The sleeve 60 is journalled in a flanged ring 67 bolted to the casing 7.

The brake drum 6 is controlled by shoes 65 pivoted to the frame 7 at 66.

The pins 40 carry a third series of gears 43 integral with the series 41 and 42.

A sleeve 51 journalled on the shaft 1 has a pinion 53 meshing with the series of gears 43. The bearing 46 is mounted on the sleeve 51. A flanged sleeve 50 is secured to the sleeve 51.

The driver member 30 of the fluid coupling, is secured to the sleeve 50. A bowl 32 covers the driver 30 and is bolted to the runner 31.

A brake drum 5 is journalled on a ball bearing 52 about the shaft 1.

The drum 5 is controlled by shoes 55 on a pivot 56.

An outer rim 57 is bolted to the drum 5.

Figure 3:
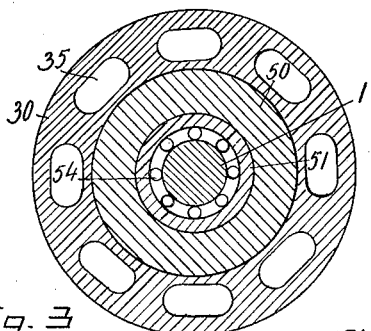
Figure 3 is a cross section of Fig. 1 on the line 3—3.

A series of apertures 35 open through the drum 6, the sleeve 50 and the driver member 30, as shown in Figure 3.

A passage 8 leads from the space at the top of the casing 7 above the rim 57.

Figure 2:
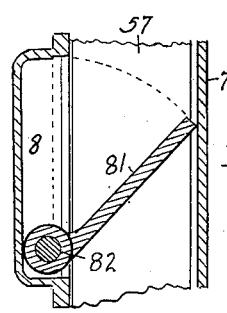
Figure 2 is a cross section of Fig. 1 on the line 2—2.

A scraper valve 81, pivoted on a pin 82 and controlled by a lever 83 bears lightly on the rim 57 when open as seen in Figure 2.

The passage 8 leads to the apertures 35. A flange 70 to the casing 7 runs parallel to the rim 57 opposite the entrance to the passage 8.

The runner member 31 has a series of perforated plugs 36 whereby the fluid can pass out of the fluid coupling. These plugs 36 are interchangeable to provide varied perforations.

With a construction such as set forth, the operation is as follows:—

The shaft 1 when the clutch to the prime mover is closed, drives through the pinion 10 the gears 41 and 42 to the pinion 20 of the tail shaft 2. The carrier 4 is held from reverse rotation by the brake drum 6, sleeve 60 and over running clutch 62, being held from rotation.

The gears 43 rotate the pinion 53, sleeves 51 and 50 and the driver member 30.

While the lever 83 holds the valve 81 closed, no oil is fed into the passage 8 to the interior of the fluid coupling, and the driver 30 rotates without resistance and slips past the runner 31.

The drive is then at low speed and is not affected by the fluid coupling.

When the lever 83 is turned to open the valve 81 as shown in Figure 2, the oil which is carried by the rim 57 from the bottom of the casing 7 is scraped off into the passage 8 and thence through the apertures 35 into the fluid coupling. As the fluid coupling begins to function and the drive of the driver 30 is taken up by the runner 31 the carrier 4 is speeded up. This rotation of the carrier 4 gradually cuts out the reduction action of the gears 41 and 42 until the entire mechanism within the casing is rotated at approximately the speed of the drive shaft 1.

The drive is then direct or high speed.

While the valve 81 is open the change of speed is automatic due to the functioning of the fluid coupling whereby the drive through the reduction gears 41 and 42 on the carrier 4 is gradually cut out.

As the oil fed to the fluid coupling is constant when the valve 81 is open, the series of outlets 36, which are selected to pass out the required amount, maintain the fluid coupling with the proper charge. When the valve 81 is closed the outlets 36 empty the fluid coupling rapidly.

When the drum 5 is held for reverse the pinion 53 being held causes the gears 43 to rotate the carrier in the reverse direction the drum 6, having been freed.

As the fluid coupling is empty as there is no feed, the members of the fluid coupling do not function the driver 39 being still while the runner rotates with the carrier 4.

Another feature of importance is that as the gear 43 is intermediate to the gears 41 and 42, the reduction at low speed to the sleeve 50 and the driver 30 will be less than to the tail shaft 2. By this means the fluid coupling will function more rapidly than if the driver were mounted on the tail shaft and the automatic cut out will operate sooner with this assembly.

By varying the proportions of the pinion 53 and the gear 43, the speed of rotation of the driver 30 of the fluid coupling can be adjusted to increase or decrease the rapidity of the automatic action of the fluid coupling.

What I claim is:—

1. In a variable speed transmission, the combination of a casing, a drive shaft journalled in the casing, a tail shaft journalled in the casing and journalling the drive shaft, adjacent pinions on the drive and tail shafts, planetary reduction gears meshing with the pinions, a carrier with pins journalling the reduction gears, a one way clutch bearing on the carrier, a third set of gears keyed to the reduction gears, a sleeve journalled on the drive shaft having a pinion meshing with the third set of gears, a Fottinger fluid coupling having driver and runner members, the driver member secured to the sleeve, the runner member integral with the carrier and means to fill and empty the fluid coupling.

2. In a variable speed transmission, the combination of a casing, a drive shaft journalled in the casing, a tail shaft journalled in the casing and journalling the drive shaft, adjacent pinions on the drive and tail shafts, planetary reduction gears meshing with the pinions, a carrier with pins journalling the reduction gears, a one way clutch bearing on the carrier a third set of gears keyed to the reduction gears, a sleeve journalled on the drive shaft having a pinion meshing with the third set of gears, a Fottinger fluid coupling having driver and runner members the driver member secured to the sleeve, the runner member integral with the carrier and a brake drum secured to the sleeve, an outer rim to the brake drum, a scraper valve pivoted to the casing, bearing when open on the outer rim, a passage from the scraper valve to a series of apertures into the driver member of the fluid coupling, and a manual controlled lever to the scraper valve.

3. In a variable speed transmissiong the combination of a casing, a drive shaft, a tail shaft journalling the drive shaft, both shafts journalled in the casing, planetary reduction gears between the shafts, a carrier with pins journalling the reduction gears and a third set of gears keyed to the reduction gears, a sleeve journalled on the drive shaft having a pinion meshing with the third set of gears, a brake drum secured to the sleeve, a Fottinger fluid coupling having driver and runner members, the driver member secured to the sleeve, the runner member integral with the carrier, a series of passages through the brake drum and through the driver member into the fluid coupling, and manually controlled means operating on the brake drum to feed oil from the casing into the passages and fluid coupling.

4. In a variable speed transmission, the combination of a casing, a drive shaft and a tail shaft, journalled axially in the casing, planetary reduction gears between the shafts, a carrier having pins journalling the reduction gears and a third set of gears keyed to the reduction gears, a brake drum secured to a sleeve having a pinion meshing with the third set of gears, a Fottinger fluid coupling between the carrier and the brake drum, and manually controlled means to fill and empty the fluid coupling.

5. In a variable speed transmission the combination of a casing, drive and tail shafts journalled axially in the casing, reduction gears including a reverse gear between the shafts, means including a Fottinger fluid coupling to cut out the reduction gear, a brake drum to the reverse gear and manually controlled means operating on the brake drum to fill and empty the fluid coupling.

6. In a variable speed transmission the combination of a casing, drive and tail shafts journalled axially in the casing, planetary reduction gears between the shafts, a carrier having pins journalling the reduction gears, a brake drum journalled on the drive shaft, a Fottinger fluid coupling between the carrier and the brake drum, and manual controlled means operating on the brake drum to fill and empty the fluid coupling.

WILLIAM A. DUFFIELD.